(12) United States Patent
McDonald et al.

(10) Patent No.: US 8,148,450 B2
(45) Date of Patent: Apr. 3, 2012

(54) PROCESS TO PRODUCE A HYDROCARBON RUBBER CEMENT UTILIZING A HYDROFLUOROCARBON DILUENT

(75) Inventors: Michael F. McDonald, Kingwood, TX (US); Scott T. Milner, Somerville, NJ (US); Timothy D. Shaffer, Hackettstown, NJ (US); Robert N. Webb, Kingwood, TX (US); Richard D. Hembree, Zachary, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1354 days.

(21) Appl. No.: 11/473,732

(22) Filed: Jun. 23, 2006

(65) Prior Publication Data

US 2007/0299190 A1 Dec. 27, 2007

(51) Int. Cl.
*C08F 6/00* (2006.01)
(52) U.S. Cl. ........ 523/332; 524/462; 524/474; 524/490; 585/867
(58) Field of Classification Search ............... 523/332; 524/462, 474, 490; 585/867
See application file for complete search history.

(56) References Cited

U.S. PATENT DOCUMENTS

| | | |
|---|---|---|
| 2,534,698 A | 12/1950 | Calfee et al. |
| 2,542,559 A | 2/1951 | Nelson et al. |
| 2,548,415 A | 4/1951 | Welch et al. |
| 2,644,809 A | 7/1953 | Saylor, Jr. |
| 2,940,960 A | 6/1960 | Tegge et al. |
| 2,958,667 A | 11/1960 | Eby et al. |
| 3,023,191 A | 2/1962 | Johnson, Jr. et al. |
| 3,257,349 A | 6/1966 | Johnson, Jr. et al. |
| 3,470,143 A | 9/1969 | Schrage et al. |
| 3,496,135 A | 2/1970 | Caywood, Jr. |
| 3,553,156 A | 1/1971 | Anolick et al. |
| 3,726,843 A | 4/1973 | Anolick et al. |
| 4,319,021 A | 3/1982 | Irani et al. |
| 4,623,712 A | 11/1986 | Irani et al. |
| 4,713,413 A | 12/1987 | Tegge et al. |
| 4,857,633 A | 8/1989 | Irani et al. |
| 4,946,940 A | 8/1990 | Guckes et al. |
| 5,264,536 A | 11/1993 | Radosz |
| 5,417,930 A | 5/1995 | McDonald, Jr. et al. |
| 5,527,870 A | 6/1996 | Maeda et al. |
| 5,624,878 A | 4/1997 | Devore et al. |
| 2004/0119196 A1 | 6/2004 | Hyunkook |
| 2006/0100398 A1* | 5/2006 | Shaffer et al. .......... 526/64 |

FOREIGN PATENT DOCUMENTS

| | | |
|---|---|---|
| DE | 10061727 | 6/2000 |
| EP | 014 934 2 | 7/1985 |
| EP | 1 343 829 | 9/2003 |
| RU | 2 209 213 | 7/2003 |
| WO | WO 00/04061 | 1/2000 |
| WO | WO 02/34794 | 5/2002 |
| WO | WO 02/096964 | 12/2002 |

OTHER PUBLICATIONS

Kennedy, Joseph, "Cationic Polymerization of Olefins, A Critical Inventory," Wiley Interscience, 1975.
Matyjaszewski, K., "Cationic Polymerizations," Marcel Dekker, Inc., 1996.
"Chemical and Engineering News," vol. 63, pp. 27, 1985.
Thaler et al., "High Molecular-Weight, High Unsaturation Copolymers of Isobutylene and Conjugated Dienes," Rubber Chemical Technology, vol. 49, pp. 960, 1976.
Bardin et al., "Lower Critical Solution Tempertures of Polyisobutylene Plus Isomeric Alkanes," D. Polymer, vol. 10, pp. 247, 1969.
Morrison and Boyd, "Marcomolecules, Polymers and Polymerization," Organic Chemistry, Chapter 31, pp. 1084-1085, 1992.
U.S. Appl. No. 11/474,214, filed Jun. 23, 2006, McDonald, et al.

* cited by examiner

*Primary Examiner* — Peter D Mulcahy
(74) *Attorney, Agent, or Firm* — Nancy T. Krawczyk; Xiaobing Feng

(57) ABSTRACT

Provided for herein is a process to produce an essentially homogeneous single liquid phase hydrocarbon-rubber cement from a polymer slurry comprising a hydrocarbon-rubber, a diluent, and unreacted monomer(s), the process comprising:

(a) contacting the polymer slurry with a hydrocarbon solvent; and
(b) removing the diluent in amounts not sufficiently more than is necessary to produce the essentially homogeneous single liquid phase hydrocarbon-rubber cement wherein the mass fraction of monomer(s) in the hydrocarbon-rubber cement, based on the total amount of hydrocarbon-rubber present in the hydrocarbon-rubber cement, is less than the mass fraction of monomer(s) in the hydrocarbon-rubber slurry, based on the total amount of hydrocarbon-rubber present in the hydrocarbon-rubber slurry, wherein the diluent comprises a hydrofluorocarbon.

75 Claims, 1 Drawing Sheet

PROCESS TO PRODUCE A HYDROCARBON RUBBER CEMENT UTILIZING A HYDROFLUOROCARBON DILUENT

FIELD OF INVENTION

This disclosure relates to a hydrocarbon-rubber cement, and to methods for producing a hydrocarbon-rubber cement from a polymer slurry comprising a hydrocarbon-rubber, a diluent, and one or more unreacted monomer(s), the method comprising the steps of contacting the polymer slurry with a hydrocarbon solvent and removing diluent, the hydrocarbon solvent, or both, in amounts not sufficiently more than is necessary to produce an essentially homogeneous single liquid phase hydrocarbon-rubber cement having a lower mass fraction of monomer(s), based on the total weight of the hydrocarbon-rubber in the hydrocarbon-rubber cement, relative to the mass fraction of monomer(s) in the polymer slurry, based on the total weight of the hydrocarbon-rubber in the polymer slurry. In particular, the present disclosure relates to contacting a hydrocarbon rubber slurry comprising a hydrofluorocarbon diluent, one or more monomer(s), and a hydrocarbon-rubber with a hydrocarbon solvent, and removing at least a portion of the diluent, the hydrocarbon solvent, or both, to produce an essentially homogeneous single liquid phase hydrocarbon-rubber cement, wherein the mass fraction of monomer(s) in the hydrocarbon-rubber cement, based on the total amount of hydrocarbon-rubber present in the hydrocarbon-rubber cement, is less than the mass fraction of monomer(s) in the hydrocarbon-rubber slurry, based on the total amount of hydrocarbon-rubber present in the hydrocarbon-rubber slurry.

BACKGROUND

Isoolefin polymers, and in particular, hydrocarbon-rubbers, may be prepared in carbocationic polymerization processes. See, e.g., *Organic Chemistry*, SIXTH EDITION, Morrison and Boyd, Prentice-Hall, 1084-1085, Englewood Cliffs, N.J. 1992, and K. Matyjaszewski, ed, *Cationic Polymerizations*, Marcel Dekker, Inc., New York, 1996. The catalyst system for producing hydrocarbon-rubbers typically includes two components: an initiator and a Lewis acid. Examples of Lewis acids include $AlCl_3$ and $BF_3$. Examples of initiators include Brønsted acids such as HCl, RCOOH (wherein R is an alkyl group), and $H_2O$. During the polymerization process, in what is generally referred to as the initiation step, the isoolefin, e.g., isobutylene, reacts with the Lewis acid/initiator pair to produce a carbenium ion. Following the initiation step, additional monomer(s) units add to the formed carbenium ion in what is generally referred to as the propagation step. These steps typically take place in a diluent or in a solvent.

Industry has generally accepted widespread use of a slurry polymerization process to produce hydrocarbon-rubbers, using methyl chloride as the diluent. Typically, the diluent used in slurry polymerization processes consists essentially of methyl chloride. Methyl chloride is employed for a variety of reasons, including the ability of methyl chloride to dissolve the monomer(s) and the aluminum chloride catalyst of the reaction mixture, but not dissolve the hydrocarbon-rubber polymer product of the polymerization process. Methyl chloride also has a suitable freezing point to permit low temperature polymerization, typically at temperatures less than or equal to −90° C. Methyl chloride also has a suitably low boiling point to allow for effective separation of the hydrocarbon-rubber polymer from the diluent. A slurry polymerization process using methyl chloride as the diluent also offers the advantage of a hydrocarbon-rubber polymer concentration of approximately 26% to 37% by volume in the reaction mixture, as opposed to a concentration of only about 8% to 12% in a solution polymerization process, wherein the hydrocarbon-rubber polymer is at least partially dissolved in a solvent. Reaction mixtures using methyl chloride as a diluent also have a relatively low viscosity, enabling the heat of polymerization formed during the polymerization reaction to be removed effectively by surface heat exchange.

Typical commercial reactors used to produce hydrocarbon-rubber in a slurry polymerization process include well mixed vessels with a volume of about 10 to 30 liters, wherein the circulation of the reaction mixture is often provided by a pump impeller. An example of such a reactor includes a continuous flow stirred tank reactor ("CFSTR") as described in U.S. Pat. No. 5,417,930, which is incorporated by reference herein. For purposes herein, a reactor suitable for use in a slurry polymerization process to produce rubber is referred to in general as a "reactor" or as a "butyl reactor".

Once the hydrocarbon-rubber is produced, at least a portion of the diluent may be removed, and the hydrocarbon-rubber may be transferred from the reaction mixture into a vehicle comprising the hydrocarbon-rubber and a solvent. This vehicle is referred to as a hydrocarbon-rubber cement, or merely as a cement. However, the residual monomer(s) and other impurities present in the reaction mixture may also be transferred into the hydrocarbon-rubber cement. The residual monomer(s) and other impurities are known to negatively effect subsequent processing of the hydrocarbon-rubber. It has long been recognized that substantial economies in polymer processes, improved physical properties of the hydrocarbon-rubber, as well as cost and processes savings related to the slurry polymerization process could be achieved by removing residual monomer(s) and other impurities from the hydrocarbon-rubber cement.

Other background references of interest include U.S. Pat. Nos. 2,542,559; 2,940,960; 3,553,156; 3,470,143; 3,496,135; 3,726,843; 4,623,712; 4,857,633; 5,264,536; 5,624,878; and 5,527,870; U.S. Patent Application US2004/0119196A1; RU 2 209 213; DE 100 61 727 A; EP 014 934 2 A2; WO 02/096964; WO 02/34794; and WO 00/04061.

SUMMARY OF THE INVENTION

In some embodiments, this disclosure relates to a process to produce an essentially homogeneous single liquid phase hydrocarbon-rubber cement from a polymer slurry comprising a hydrocarbon-rubber, a diluent, and unreacted monomer(s), the process comprising:
 (a) contacting the polymer slurry with a hydrocarbon solvent; and
 (b) removing the diluent in amounts not sufficiently more than is necessary to produce the essentially homogeneous single liquid phase hydrocarbon-rubber cement wherein the mass fraction of monomer(s) in the hydrocarbon-rubber cement, based on the total amount of hydrocarbon-rubber present in the hydrocarbon-rubber cement, is less than the mass fraction of monomer(s) in the hydrocarbon-rubber slurry, based on the total amount of hydrocarbon-rubber present in the hydrocarbon-rubber slurry,
wherein the diluent comprises a hydrofluorocarbon.

Additionally, this disclosure relates to a process to produce an essentially homogeneous hydrocarbon-rubber cement from a polymer slurry comprising a hydrocarbon-rubber, a diluent which is essentially free of a hydrofluorocarbon diluent, and a first mass fraction of unreacted monomer(s) based on the total amount of hydrocarbon rubber present in the polymer slurry, comprising:

(a) contacting the polymer slurry with a hydrofluorocarbon diluent and with a hydrocarbon solvent; and (b) removing at least a portion of the diluent and the hydrofluorocarbon diluent to produce the essentially homogeneous hydrocarbon-rubber cement having a second mass fraction of unreacted monomer(s) based on the total amount of hydrocarbon rubber present in the essentially homogeneous hydrocarbon rubber cement, wherein the first mass fraction is greater than the second mass fraction.

In some further embodiments, this disclosure relates to a process for retrofitting an existing slurry cationic polymerization plant, the retrofitting process comprising the steps of:

(a) contacting a polymer slurry from the slurry cationic polymerization plant with a hydrocarbon solvent, the polymer slurry comprises a hydrocarbon-rubber, a diluent, and a first mass fraction of unreacted monomer(s) based on the total amount of hydrocarbon rubber present in the polymer slurry; and (b) removing at least a portion of the diluent to produce an essentially homogeneous hydrocarbon-rubber cement having a second mass fraction of unreacted monomer(s) based on the total amount of hydrocarbon rubber present in the essentially homogeneous hydrocarbon-rubber cement, wherein the diluent comprises a hydrofluorocarbon, and wherein the first mass fraction is greater than the second mass fraction.

In yet further embodiments, this disclosure relates to a process for retrofitting an existing slurry cationic polymerization plant, the retrofitting process comprising the steps of:

(a) contacting a polymer slurry from the slurry cationic polymerization plant with a hydrofluorocarbon diluent and with a hydrocarbon solvent, the polymer slurry comprises a hydrocarbon-rubber, a diluent which is essentially free of a hydrofluorocarbon diluent, and a first mass fraction of unreacted monomer(s) based on the total amount of hydrocarbon rubber present in the polymer slurry;

(b) removing at least a portion of the diluent and the hydrofluorocarbon diluent to produce the essentially homogeneous hydrocarbon-rubber cement having a second mass fraction of unreacted monomer(s) based on the total amount of hydrocarbon rubber present in the essentially homogeneous hydrocarbon rubber cement, wherein the first mass fraction is greater than the second mass fraction.

In some additional embodiments, this disclosure relates to a process to produce a single liquid phase hydrocarbon-rubber cement from a polymer slurry comprising a hydrocarbon-rubber, a diluent, and a first mass fraction of unreacted monomer(s) in the polymer slurry based on the total weight of the hydrocarbon-rubber in the polymer slurry, the process comprising:

(a) contacting the polymer slurry with a hydrocarbon solvent; and (b) removing at least a portion of the diluent from the polymer slurry to produce the single liquid phase hydrocarbon-rubber cement having a second mass fraction of unreacted monomer(s) in the hydrocarbon-rubber cement, based on the total amount of hydrocarbon-rubber present in the hydrocarbon-rubber cement, wherein the diluent comprises a hydrofluorocarbon and the first mass fraction is higher than the second mass fraction.

DETAILED DESCRIPTION

Various specific embodiments, versions and examples of the present disclosure will now be described, including preferred embodiments and definitions that are adopted herein for purposes of understanding the claimed invention. For determining infringement, the scope of the "invention" will refer to any one or more of the appended claims, including equivalents thereof, and elements or limitations that are equivalent to those recited.

For purposes of this disclosure and the claims thereto, the terms "hydrocarbon-rubber polymer", "hydrocarbon-rubber", and "rubber" are used interchangeably herein, and refer to elastomers or elastomeric compositions of polymers consistent with the ASTM D1566 definition. In preferred embodiments, hydrocarbon-rubber polymers include polyisobutylene homopolymers, isobutylene-isoprene (butyl rubber) copolymers, isobutylene and para-methylstyrene copolymers, star-branched butyl rubber terpolymers, and the like.

The term catalyst system refers to and includes any Lewis acid(s) or other metal complex(es) used to catalyze the polymerization of the olefinic monomer(s) to produce hydrocarbon-rubber polymers, as well as at least one initiator, and optionally other catalyst component(s).

The phrase "suitable polymerization conditions" relates to the selection of polymerization conditions and components, well within the ability of those skilled in the art, which are necessary to obtain the production of a desired polymer in light of process parameters and component properties. There are numerous permutations of the slurry polymerization process to produce hydrocarbon-rubber polymers, as well as numerous variations in the polymerization components available to produce a hydrocarbon-rubber having one or more desired attributes.

Downstream processing of the hydrocarbon-rubber polymers may be carried out in a vehicle comprising the hydrocarbon-rubber and a solvent, preferably a hydrocarbon solvent. This vehicle is referred to herein as a hydrocarbon-rubber cement, as a rubber cement, or as a cement. For purposes herein, these terms are used interchangeably, and refer to a mixture of a hydrocarbon-rubber and a solvent, wherein the hydrocarbon-rubber is at least partially soluble in the solvent. Preferably, the cement is an essentially homogeneous solution comprising the hydrocarbon-rubber polymer essentially dissolved in a hydrocarbon solvent. An essentially homogeneous solution refers to a solution wherein at least 99 wt % of the solute (e.g., the hydrocarbon-rubber) is dissolved in the solvent (e.g., the hydrocarbon solvent.)

Preferably, essentially all of the hydrocarbon rubber (i.e., greater than 99 wt % of the hydrocarbon-rubber) is dissolved in the hydrocarbon solvent, such that the hydrocarbon-rubber cement is an essentially homogeneous solution with regard to the hydrocarbon-rubber and the hydrocarbon solvent, meaning that at least 99 wt % of the hydrocarbon-rubber is dissolved in the solvent. It is to be understood for purposes herein that when the term "essentially homogeneous" or "homogeneous" is used to further describe a hydrocarbon-rubber cement (i.e., an essentially homogeneous hydrocarbon-rubber cement); the term only refers to the hydrocarbon-rubber and the solvent. Accordingly, an essentially homogeneous hydrocarbon-rubber cement need not comprise a single phase, but may include less than 1 wt % of solids including various impurities and other components, which are not fully dissolved in the hydrocarbon solvent.

The term "polymer slurry" may refer to a reactor effluent comprising any gas, liquid, solid, or combination thereof, contained in a reaction mixture after a slurry polymerization process. The term "polymer slurry" may also refer to a hydrocarbon-rubber polymer dispersed within a diluent, whether or not the polymer slurry is a direct reaction product from a slurry polymerization process. The polymer slurry referred to herein may include a hydrocarbon-rubber polymer, a diluent or mixture of diluents, a hydrocarbon solvent, unreacted monomer(s), as well as various other impurities and components which exist in the olefin feed or catalyst systems utilized in the slurry polymerization process. The catalyst system or catalyst system components are present only to the extent that they are present after polymerization.

As used herein, the term diluent refers to a diluting agent, in which the monomer(s) and/or the catalyst are soluble, but in which the hydrocarbon-rubber produced has only a limited solubility or preferably in which the hydrocarbon-rubber is essentially insoluble. As used herein, a hydrocarbon-rubber is essentially insoluble in a diluent if less than 1 wt % of the hydrocarbon-rubber is soluble in the diluent, based on the total amount of the diluent present. The term diluent may also include mixtures of at least two or more diluents. While a diluent may not alter the general nature of the components of the polymerization reaction mixture, i.e., the components of the catalyst system, monomer(s), and the like, it is recognized that interactions between the diluent and reactants may occur during the slurry polymerization process.

Various other terms used herein include a reactor, which is defined as any container(s) in which a chemical reaction occurs. For purposes herein, the numbering scheme for the Periodic Table Groups are used as in CHEMICAL AND ENGINEERING NEWS, 63(5), 27 (1985). The term polymer may refer to a homopolymer, a copolymer, an interpolymer, a terpolymer, and/or the like. Likewise, a copolymer may refer to a polymer comprising at least two monomer(s) unless otherwise stated.

When a polymer is referred to as comprising a monomer(s), the monomer(s) is present in the polymer in the polymerized form of the monomer(s) or in the derivative form of the monomer(s). When catalyst components are described as comprising neutral stable forms of the components, it is well understood by one skilled in the art, that the ionic form of the component is the form that reacts with the monomer(s) to produce polymers.

The term "alkyl" refers to paraffinic hydrocarbon groups having from 1 to 20 carbon atoms, which may be derived from the corresponding alkane by removing one or more hydrogens from the formula. Examples include a methyl group ($CH_3$), which is derived from methane ($CH_4$), and an ethyl group ($CH_3CH_2$), which is derived from ethane ($CH_3CH_3$).

The term "aryl" refers to a hydrocarbon group comprising 5 to 20 carbon atoms that form a conjugated ring structure characteristic of aromatic compounds. Examples of aryl groups or substituents include benzene, naphthalene, phenanthrene, anthracene, and the like, which possess alternating double bonding ("unsaturation") within a cyclic structure. An aryl group is thus a group derived from an aromatic compound by dropping one or more hydrogens from the formula.

The term "substituted functional group(s)" refers to replacement of at least one hydrogen atom on an alkyl, alkene, alkyne, or aryl group having 1 to 20 carbon atoms, by at least one substituent. Examples of substituents include halogen (chlorine, bromine, fluorine, or iodine), amino, nitro, sulfoxy (sulfonate or alkyl sulfonate), thiol, alkylthiol, hydroxy, alkoxy, and straight, branched, or cyclic alkyls, alkenes, or alkynes having 1 to 20 carbon atoms. Examples of alkyl substituents include methyl, ethyl, propyl, tert-butyl, isopropyl, isobutyl, and the like. Examples of alkoxy substituents include methoxy, ethoxy, propoxy, isopropoxy, butoxy, isobutoxy, secondary butoxy, tertiary butoxy, pentyloxy, isopentyloxy, hexyloxy, heptyloxy, octyloxy, nonyloxy, and decyloxy. Haloalkyl refers to straight or branched chain alkyl groups having 1 to 20 carbon atoms in which at least one hydrogen atom is substituted by at least one halogen.

Monomer(s) and Polymers

Monomer(s) useful in the present disclosure include any olefinic monomer(s) that may be cationically polymerized to produce a hydrocarbon-rubber polymer using a slurry polymerization process. Preferred monomer(s) include one or more alpha-olefins, disubstituted olefins, isoolefins, conjugated dienes, non-conjugated dienes, styrenics, substituted styrenics, and/or vinyl ethers. The styrenic moieties may be substituted (on the ring) with alkyl, aryl, halide, alkoxide, or the like substituents. Preferably, the monomer(s) comprises 2 to 20 carbon atoms, more preferably 2 to 9, even more preferably 3 to 9 carbon atoms. Examples of preferred olefin monomer(s) include styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, β-pinene, myrcene, 6,6-dimethylfulvene, hexadiene, cyclopentadiene, piperylene, methyl vinyl ether, ethyl vinyl ether, isobutyl vinyl ether, and the like. Monomer(s) may also include combinations of two or more monomer(s). Block copolymers, including styrenic block copolymers, may also be used a monomer(s). Preferred block copolymers for use as monomer(s) include copolymers of styrenics, such as styrene, para-methylstyrene, alpha-methylstyrene, and $C_4$ to $C_{30}$ diolefins, such as isoprene, butadiene, and the like. Particularly preferred monomer(s) combinations include isobutylene/para-methyl styrene and isobutylene/isoprene. Homopolymers of isobutylene are also preferred. Other monomer(s) suitable for use herein include those described in *Cationic Polymerization of Olefins, A Critical Inventory*, Joseph Kennedy, Wiley Interscience, New York 1975.

The process disclosed herein may be applied to the formation of a rubber cement comprising a broad range of rubber polymers. Examples of suitable rubber polymers include butyl rubber, polyisoprene, polychloroprene, polybutadiene, polybutene, ethylene-propylene rubber (EPM), ethylene propylene-nonconjugated dienes, which may be utilized in preparing EPDM, and which include methylene norbornene, ethylidene norbornene, 1-4 hexadiene, dicyclopentadiene, and the like. Other preferred rubber polymers include copolymers of isobutylene and an alkylstyrene, and copolymers of isobutylene and isoprene.

In one embodiment the rubber cement may comprise butyl rubber polymers prepared by reacting a comonomer(s) mixture comprising a $C_4$ to $C_6$ isoolefin monomer(s) component such as isobutene and a multiolefin or conjugated diene monomer(s) component. The isoolefin is preferably present in the butyl rubber polymer at 70 to 99.5 wt %, based of the total comonomer(s) mixture, preferably 85 to 99.5 wt %, more preferably 92 to 99.5 wt %. The conjugated diene component is preferably present in the butyl rubber polymer at 0.5 to 30 wt %, more preferably 0.5 to 15 wt %, with 0.5 to 8 wt % being more preferred. The $C_4$ to $C_6$ isoolefin may be one or more of isobutene, 2-methyl-1-butene, 3-methyl-1-butene, 2-methyl-2-butene, and 4-methyl-1-pentene. The multiolefin may be a $C_4$ to $C_{14}$ conjugated diene such as isoprene, butadiene, 2,3-dimethyl-1,3-butadiene, β-pinene, myrcene, 6,6-dimethyl-fulvene, hexadiene, cyclopentadiene and piperylene. In a preferred embodiment, the rubber cement comprises a butyl rubber polymer obtained by reacting 85 to 99.5 wt % of isobutylene with 0.5 to 15 wt % isoprene, or by reacting 95 to 99.5 wt % isobutylene with 0.5 to 5 wt % isoprene.

This disclosure further relates to a rubber-cement comprising terpolymers and/or tetrapolymers comprising any combination of the monomer(s) listed-above. Preferred terpolymers and tetrapolymers include rubber polymers comprising isobutylene, isoprene and divinylbenzene, rubber polymers comprising isobutylene, para-alkylstyrene (preferably paramethyl styrene) and isoprene, rubber polymers comprising cyclopentadiene, isobutylene, and paraalkyl styrene (preferably paramethyl styrene), rubber polymers comprising isobutylene cyclopentadiene and isoprene, rubber polymers comprising cyclopentadiene, isobutylene, and methyl cyclopentadiene, and rubber polymers comprising isobutylene, paramethylstyrene and cyclopentadiene.

Lewis Acid Catalyst

The Lewis acid catalyst (also referred to as the co-initiator or catalyst) may be any Lewis acid comprising one or more metals or metalloids from Groups 4, 5, 13, 14 or 15 of the Periodic Table of the Elements, including boron, aluminum, gallium, indium, titanium, zirconium, tin, vanadium, arsenic, antimony, and bismuth. In an embodiment, the metals are aluminum, boron and titanium, with aluminum being more preferred. Illustrative examples of Lewis acid catalysts useful herein include $AlCl_3$, $AlBr_3$ ($C_1$-$C_{10}$ alkyl)$AlCl_2$, ($C_1$-$C_{10}$ alkyl)$_2AlCl$, ($C_1$-$C_{10}$ alkyl)$_3Al_2Cl_3$, $BF_3$, $SnCl_4$, and $TiCl_4$. Preferred Lewis acid catalysts include $AlCl_3$, ethylaluminum dichloride, ethylaluminum sesquichloride, diethylaluminum chloride, methylaluminum dichloride, methylaluminum sesquichloride, and dimethylaluminum chloride. Lewis acids such as methylaluminoxane (MAO) and specifically designed weakly coordinating Lewis acids such as $B(C_6F_5)_3$ are also suitable for use as Lewis acid catalysts herein.

As one skilled in the art will recognize, the aforementioned listing of Lewis acids is not exhaustive and is provided for illustration. For more information regarding Lewis acids in polymerization processes, see, for example, International Application Nos. PCT/US03/40903 and PCT/US03/40340.

Catalyst Initiator

Initiators useful in this disclosure are those initiators which are capable of being complexed in a suitable diluent with the chosen Lewis acid to yield a complex which rapidly reacts with the olefin thereby forming a propagating polymer chain. Illustrative examples include Brønsted acids such as $H_2O$, HCl, RCOOH (wherein R is H or a $C_1$-$C_{20}$ alkyl group), and alkyl halides, such as $(CH_3)_3CCl$, $C_6H_5C(CH_3)_2Cl$ and (2-Chloro-2,4,4-trimethylpentane). In addition, transition metal complexes including metallocenes and other single site catalyst systems which have been activated with a weakly coordinating Lewis acids or Lewis acid salt may be been used to initiate polymerization.

In an embodiment, the initiator comprises one or more of a hydrogen halide, a $C_1$ to $C_{20}$ carboxylic acid, a $C_1$ to $C_{20}$ carboxylic acid halide, a $C_1$ to $C_{20}$ sulfonic acid, a $C_1$ to $C_{20}$ alcohol, a phenol, a tertiary $C_1$ to $C_{20}$ alkyl halide, a tertiary $C_1$ to $C_{20}$ arylalkyl halide, a tertiary $C_1$ to $C_{20}$ alkyl ester, a tertiary $C_1$ to $C_{20}$ arylalkyl ester, a tertiary $C_1$ to $C_{20}$ alkyl ether, a tertiary $C_1$ to $C_{20}$ arylalkyl ether, a $C_1$ to $C_{20}$ alkyl halide, a $C_1$ to $C_{20}$ aryl halide, a $C_1$ to $C_{20}$ alkylaryl halide, and/or a $C_1$ to $C_{20}$ arylalkylacid halide. The aforementioned listing of initiator(s) is not exhaustive and is provided for illustration. For more information regarding initiator(s) in polymerization processes, see, for example, International Application Nos. PCT/US03/40903 and PCT/US03/40340.

Formation of the Hydrocarbon-Rubber Polymer Slurry

The hydrocarbon-rubber polymer slurry utilized herein may be produced in a continuous or a batch process. Furthermore, the process may be practiced in a plug flow reactor, a stirred tank reactor, a continuous flow stirred tank reactor, a moving belt or drum reactor, a jet or nozzle reactor, a tubular reactor, an autorefrigerated boiling-pool reactor, or any combination thereof. The order of contacting the monomer(s) feed-stream, catalyst, initiator, and diluent may vary from one embodiment to another. The temperature at which the hydrocarbon-rubber polymer slurry is produced may be less than −20° C., preferably less than −40° C., with less than −50° C. being more preferred. For more information regarding polymerization processes, see, for example, International Application Nos. PCT/US03/40903 and PCT/US03/40340.

The hydrocarbon-rubber polymer slurry may also comprise a hydrocarbon-rubber dispersed within a diluent, which is not the direct reaction product of a slurry polymerization process.

Hydrocarbon Rubber Polymer Slurry

As stated above, the hydrocarbon-rubber polymer slurry may include the hydrocarbon rubber polymer, a diluent, preferably a hydrofluorocarbon diluent or mixture of diluents, unreacted monomer(s), various impurities, as well as other components in the feed or catalyst systems. The hydrocarbon-rubber polymer exists within the polymer slurry mainly as a solid material. In an embodiment, the concentration of the rubber polymer in the polymer slurry is greater than or equal to about 5 vol %, and less than or equal to about 75 vol %, based on the total volume of the polymer slurry. Within this range, the concentration of the rubber polymer in the polymer slurry may be greater than or equal to about 10 wt %, preferably greater than or equal to about 15 wt %, with greater than or equal to about 20 wt % being more preferred. Also within this range, the concentration of rubber polymer in the polymer slurry may be less than or equal to about 70 vol %, preferably less than or equal to about 65 vol %, with less than or equal to about 60 vol. % being more preferred.

Diluent

The diluent employed in producing the rubber cement according to the instant process may be any material, in which the monomer(s), catalyst, and other process related components are soluble, but in which the hydrocarbon-rubber polymer has limited solubility, or preferably in which the hydrocarbon-rubber is essentially insoluble as defined above. Preferred diluents include $C_1$-$C_3$ hydrocarbons which are a gas at room temperature and 101 kPa-a (1 atm) of pressure. More preferred diluents include chlorocarbons such as methyl chloride, chloro-fluoro carbons, and the like. Methyl chloride being the most preferred diluent. The diluent in the polymer slurry may also comprise, or may consist essentially of, a hydrofluorocarbon diluent.

Process for Forming a Hydrocarbon-Rubber Cement

In an embodiment, the hydrofluorocarbon diluent is present within the rubber polymer slurry during the slurry polymerization process. In another embodiment, the hydrofluorocarbon diluent is added to the polymer slurry after the slurry polymerization process. The polymer slurry comprising the hydrofluorocarbon diluent is then contacted with a $C_4$-$C_{10}$ hydrocarbon solvent, preferably a $C_5$-$C_8$ hydrocarbon solvent. Diluent, the hydrocarbon solvent, or both, are then removed from the combined solvent and polymer slurry mixture in amounts not sufficiently more than is necessary to provide for an essentially homogeneous single liquid phase rubber cement in the form of an essentially homogeneous solution (i.e., comprising less than 1 wt % solids) comprising the hydrocarbon-rubber and the hydrocarbon solvent at the desired operating temperature and pressure.

The polymer slurry may also comprise a diluent which is essentially free of a hydrofluorocarbon diluent. A diluent which is essentially free of a hydrofluorocarbon diluent is defined herein to be a diluent comprising less than 1 wt % of a hydrofluorocarbon diluent, based on the total amount of the diluent present. In an embodiment, the polymer slurry comprising a diluent which is essentially free of a hydrofluorocarbon diluent is contacted with a $C_4$-$C_{10}$ hydrocarbon solvent, preferably a $C_5$-$C_8$ hydrocarbon solvent. The combined polymer slurry and solvent are then contacted with the hydrofluorocarbon diluent. Diluent, the hydrofluorocarbon diluent, the hydrocarbon solvent, or a combination thereof, are then removed from the combined solvent, polymer slurry, and hydrofluorocarbon diluent mixture in amounts not sufficiently more than is necessary to produce an essentially homogeneous single liquid phase rubber cement in the form of an essentially homogeneous solution comprising the hydrocarbon-rubber and the hydrocarbon solvent.

The amount of hydrocarbon solvent added to the polymer slurry is based on a desired final concentration of hydrocarbon rubber in the cement, and may include a portion of the solvent that may be removed along with the diluent in forming the rubber cement. The amount of diluent present in the polymer slurry may depend on reaction conditions and other factors and attributes of the slurry polymerization process. It has unexpectedly been discovered that the concentrations of hydrocarbon solvent required, and the amount of diluent required to be removed from the polymer slurry to produce the essentially homogeneous hydrocarbon-rubber cement, may be influenced by the selection and concentration of a hydrofluorocarbon diluent either present in the polymer slurry, or subsequently added to the polymer slurry.

The polymer slurry comprising an appropriately selected hydrofluorocarbon diluent may require a larger portion of the diluent and/or the hydrocarbon solvent to be removed to produce the essentially homogeneous single liquid phase rubber cement, as compared to an identical polymer slurry under identical conditions, but which employs a diluent which is essentially free of a hydrofluorocarbon diluent. Accordingly, to produce a homogeneous hydrocarbon cement from a polymer slurry comprising a hydrofluorocarbon diluent, more of the diluent will need to be removed from the combined polymer slurry and hydrocarbon solvent mixture when a diluent comprising a hydrofluorocarbon is present, as compared to a diluent which is essentially free of a hydrofluorocarbon diluent. For example, after addition of a given amount of a hydrocarbon solvent to a polymer slurry comprising a hydrofluorocarbon diluent, more of the diluent will need to be removed to produce an essentially homogeneous rubber cement, as compared to the amount of diluent required to be removed under identical conditions wherein the diluent consists essentially of methyl chloride. Upon removal of diluent to produce the essentially homogeneous rubber cement, unreacted monomer(s) and other volatile impurities are also removed. Accordingly, it has been discovered that by appropriate selection of a hydrofluorocarbon diluent, either alone, or in combination with methyl chloride and/or other diluents, an essentially homogeneous rubber cement may be produced which comprises less monomer(s) and other impurities relative to the amount of hydrocarbon rubber present, than would result from a cement produced under the same conditions in the absence of the hydrofluorocarbon diluent (i.e., under the same conditions using a diluent essentially free of a hydrofluorocarbon diluent.)

In one embodiment, a process to produce an essentially homogeneous hydrocarbon-rubber cement comprises the steps of contacting a polymer slurry comprising a hydrocarbon-rubber, a diluent, and unreacted monomer(s), with a hydrocarbon solvent; and removing the diluent in amounts not sufficiently more than is necessary to produce the essentially homogeneous single liquid phase hydrocarbon-rubber cement wherein the mass fraction of monomer(s) in the hydrocarbon-rubber cement, based on the total amount of hydrocarbon-rubber present in the hydrocarbon-rubber cement, is less than the mass fraction of monomer(s) in the hydrocarbon-rubber slurry, based on the total amount of hydrocarbon-rubber present in the hydrocarbon-rubber slurry.

In another embodiment, a process to produce an essentially homogeneous hydrocarbon-rubber cement comprises the steps of contacting a polymer slurry comprising a hydrocarbon-rubber, a diluent which is essentially free of a hydrofluorocarbon diluent, and a first mass fraction of unreacted monomer(s) based on the total amount of hydrocarbon rubber present in the polymer slurry, with a hydrofluorocarbon diluent and with a hydrocarbon solvent; and removing the diluent and the hydrofluorocarbon diluent in amounts not sufficiently more than is necessary to produce the essentially homogeneous hydrocarbon-rubber cement having a lower mass fraction of unreacted monomer(s) based on the total amount of hydrocarbon rubber present in the essentially homogeneous hydrocarbon rubber cement than present in the initial polymer slurry In an embodiment, at least a portion of the hydrofluorocarbon diluent may be added prior to addition of the hydrocarbon solvent to the polymer slurry, after addition of the hydrocarbon solvent to the polymer slurry, or simultaneous with the addition of the hydrocarbon solvent to the polymer slurry. The hydrofluorocarbon diluent and/or the hydrocarbon solvent may also be added stepwise and/or incrementally to the polymer slurry, to the combined polymer slurry and hydrocarbon solvent mixture, to the combined polymer slurry and hydrofluorocarbon diluent mixture, or any combination thereof.

Accordingly, in an embodiment, the diluent may comprise only a portion of the total amount of hydrofluorocarbon diluent required to produce the essentially homogeneous rubber cement, and an additional amount of the hydrofluorocarbon diluent may be added at any point or points in the process consistent with the desired outcome of a hydrocarbon rubber cement having a mass fraction of monomer(s) relative to the total amount of rubber present, which is less than the mass fraction of monomer(s) relative to the total amount of rubber present in the polymer slurry, from which the rubber cement was produced.

The amount of diluent that is to be removed from the system in order to prepare an essentially homogeneous rubber cement is determined from the composition of the hydrocarbon-rubber slurry (i.e. mass fractions of the hydrocarbon-rubber and the diluent), the desired hydrocarbon-rubber cement concentration (i.e. mass fraction of hydrocarbon-rubber polymer in the hydrocarbon solvent) and the compositional phase diagram which describes the temperature-dependent phase behavior of the hydrocarbon-rubber as a function of diluent mass fraction in the cement. Removal of the diluent in amounts not sufficiently more than is necessary to produce the essentially homogeneous hydrocarbon-rubber cement refers to removing diluent in amounts necessary to obtain a cement composition that is within ±15%, preferably within ±10%, more preferably within ±5%, of the composition that defines the boundary curve at a given temperature, a given diluent composition, and a given desired hydrocarbon-rubber cement concentration in the phase diagram.

Figure 1:
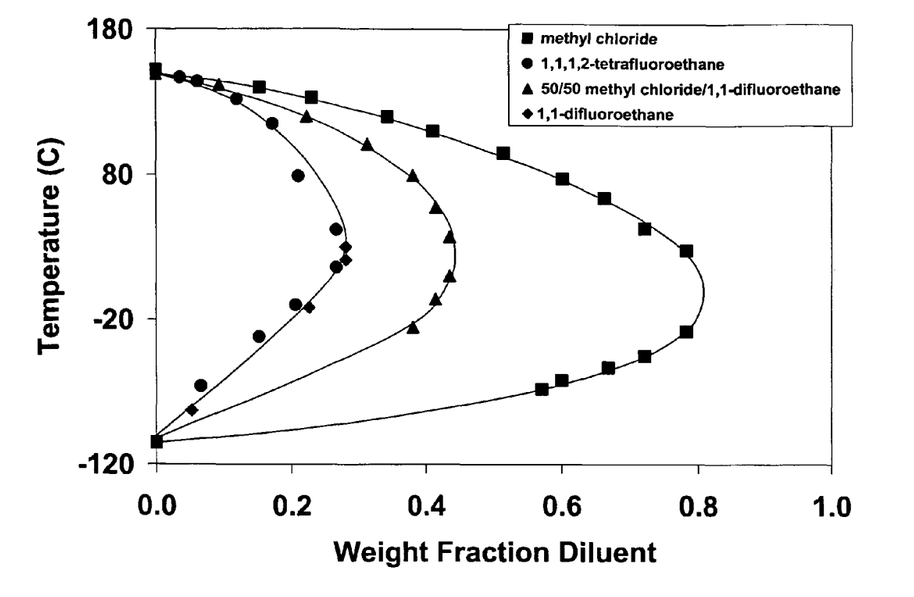
FIG. 1 shows a combined LCST and UCST phase diagram of butyl rubber dissolved in hexane using methyl chloride (MeCl), 1,1,1,2-tetrafluoroethane (134a), and 1:1 blend of methyl chloride and 1,1-difluoroethane (152a).

Examples of compositional phase diagrams of butyl rubber in hexane-based cements with hydrofluorocarbons are given in FIG. 1 along with the phase diagram of the comparative methyl chloride system.

Selection of the Hydrofluorocarbon Diluent

Hydrofluorocarbon diluents of the present disclosure comprise at least one carbon atom, at least one hydrogen atom, and at least one fluorine atom. In a preferred embodiment, the hydrofluorocarbon diluent consists essentially of carbon, hydrogen, and fluorine. In a more preferred embodiment, the hydrofluorocarbon diluent is a saturated compound consisting essentially of hydrogen, carbon and fluorine. Hydrofluorocarbon diluents may include a combination of hydrofluorocarbon diluents, and may be used alone, or in combination with other diluents, solvents, and the like.

Preferably, the hydrofluorocarbon diluent is a gas at 25° C. and 101 kPa-a (1 atm) of pressure, and has a higher vapour pressure (i.e., a lower boiling point) than the hydrocarbon solvent utilized to produce the essentially homogeneous hydrocarbon rubber cement. In a preferred embodiment, the hydrofluorocarbon diluent comprises a hydrofluorocarbon represented by the formula: $C_xH_yF_z$ wherein x is an integer from 1 to 10, alternatively from 1 to 9, alternatively from 1 to 8, alternatively from 1 to 7, alternatively from 1 to 6, alternatively from 1 to 5, alternatively from 1 to 4, alternatively from 1 to 3, with 2 being most preferred; y is at least 1; and z is at least 1. In a preferred embodiment, the hydrofluorocarbon diluent comprises at least two carbon atoms, and at least two fluorine atoms.

Illustrative examples of suitable hydrofluorocarbon diluents include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4- pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,4-octafluorobutane; 1,1,1,2,2,3,4,4-octafluorobutane; 1,1,1,2,3,3,4,4-octafluorobutane; 1,1,2,2,4,4,4-octafluorobutane; 1,1,1,2,3,4,4,4-octafluorobutane; 1,1,1,2,2,3,3,4-nonafluorobutane; 1,1,1,2,2,3,4,4,4-nonafluorobutane; 1,1,1-trifluoro-2-methylpropane; 1,1,3-trifluoro-2-methylpropane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; and mixtures thereof. Particularly preferred hydrofluorocarbon diluents include 1,1,2-trifluoroethane, and 1,1,1,2-tetrafluoroethane with 1,1,1,2-tetrafluoroethane being particularly preferred.

Illustrative examples of unsaturated hydrofluorocarbon diluents include 1,1,2-trifluoroethene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1, 3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof and including mixtures comprising at least one of the saturated hydrofluorocarbon diluents described above.

The diluent may also comprise a blend comprising one or more of the above hydrofluorocarbon diluents in combination with one or more substituted or unsubstituted alkanes, alkenes, alkynes, or a combination thereof, each comprising from 1 to 10 carbon atoms, preferably 1 to 5 carbon atoms, with 1 to 3 carbon atoms being most preferred.

In an embodiment, the diluent may comprise a blend with methyl chloride wherein such blends comprises 5 to 90 wt % methyl chloride relative to the total amount of diluent present in the mixture, alternatively between 5 and 80 wt %, alternatively between 5 and 70 wt %, alternatively between 5 and 60 wt %, alternatively between 5 and 50 wt %, alternatively between 5 and 40 wt %, alternatively between 5 and 30 wt %, alternatively between 5 and 20 wt %, and alternatively between 5 and 10 wt %.

In another embodiment, the polymer slurry of the present disclosure is preferably essentially free of methyl chloride, wherein a polymer slurry which is essentially free of methyl chloride is defined as a polymer slurry comprising less than 1 wt % methyl chloride.

In another embodiment the hydrofluorocarbon diluents are used in combination with one or more diluent gases including carbon dioxide, nitrogen, hydrogen, argon, neon, helium, krypton, xenon, and/or other inert gases. Preferred gases include carbon dioxide and/or nitrogen.

The hydrofluorocarbon diluent may be present in the polymer slurry at greater than 2 wt %, up to 100 wt % based upon the total weight of the diluent present in the hydrocarbon-rubber polymer slurry. Within this range, the diluent preferably comprises at least 5 wt %, preferably at least 10 wt %, preferably at least 15 wt %, preferably at least 20 wt %, preferably at least 25 wt %, preferably at least 30 wt %, preferably at least 35 wt %, preferably at least 40 wt %, preferably at least 45 wt %, preferably at least 50 wt %, preferably at least 55 wt %, preferably at least 60 wt %, preferably at least 65 wt %, preferably at least 70 wt %, preferably at least 75 wt %, preferably at least 80 wt %, preferably at least 85 wt %, preferably at least 90 wt %, with at least 95 wt % being more preferred. In a preferred embodiment, the hydrofluorocarbon diluent is selected from the group consisting of 1,1-difluoroethane, 1,1,1-trifluoroethane, 1,1,1,2-tetrafluoroethane, and mixtures thereof.

The formation of an essentially homogeneous hydrocarbon rubber cement may be affected by the temperature and pressure of the polymer slurry, the combined polymer slurry and the hydrocarbon solvent mixture, and the like. Accordingly, the process to produce an essentially homogeneous hydrocarbon rubber cement may include changing the temperature and/or pressure of the components in a particular process step. In an embodiment, the instant process may further comprises raising or lowering of the temperature of the polymer slurry, the hydrofluorocarbon diluent, the hydrocarbon solvent, or a combination thereof.

Hydrocarbon Solvents

The hydrocarbon solvent of the process disclosed herein may comprise any hydrocarbon which has a higher boiling point than the diluent(s) employed. Preferably, the hydrocarbon solvent comprises a $C_4$-$C_{10}$ hydrocarbon, or a mixture of hydrocarbons. More preferably, the hydrocarbon solvent comprises a $C_5$ to $C_7$ alkane. Hydrocarbon solvents useful herein are preferably selected such that the intended amount of hydrocarbon rubber present in the hydrocarbon-rubber slurry is soluble in the amount of solvent added to the polymer slurry at the temperatures at which the polymer slurry is contacted with the solvent. Illustrative non-limiting examples of suitable hydrocarbon solvents include linear, branched or cyclic $C_4$-$C_{10}$ hydrocarbons, preferably $C_5$-$C_8$ hydrocarbons. Specific examples of suitable hydrocarbon solvents include, but are not limited to, butane, cyclobutane, isobutane, n-pentane, cyclopentane, n-hexane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2-methylheptane, 3-ethylhexane, 2,5-dimethylhexane, 2,24,-trimethylpentane, octane, heptane, nonane, decane, dodecane, undecane, 1,1-dimethylcyclopentane, 1,2-dimethylcyclopentane, 1,3-dimethylcyclopentane, ethylcyclopentane, cyclohexane, methylcyclohexane, benzene, toluene, ortho-xylene, para-xylene, meta-xylene, and combinations thereof. A preferred solvent includes Ultra Low Benzene type hexane (ULB hexane), which is a preferred grade of hexane and consists essentially of a mixture of $C_6$ isomers, namely n-hexane, 2-methylpentane, 3-methylpentane, methylcyclopentane, and cyclohexane. The exact balance of these isomers in ULB hexane varies depending on the manufacturer.

Diluent Removal

In an embodiment, the process for preparing an essentially homogeneous hydrocarbon rubber cement comprises removal of the diluent from the polymer slurry to produce an essentially homogeneous hydrocarbon rubber cement. This removal of the diluent may also include removal of at least a portion of the hydrocarbon solvent. Removal of the diluent is preferably effected via distillation, either by exposing the combined polymer slurry and solvent mixture to a reduced pressure (e.g., via removal of added pressure and/or by pulling a vacuum on the mixture) and/or by application of heat to the system such that the diluent is separated from the hydrocarbon rubber to produce the rubber cement based on the reduced vapor pressure of the diluent relative to the hydrocarbon rubber and to the hydrocarbon solvent. As discussed above, the monomer(s) and other volatile impurities are also removed from the rubber polymer along with the diluent.

The rubber cement of the present disclosure is thus purified relative to a rubber-cement produced in the same way under the same conditions, but in the absence of a hydrofluorocarbon diluent, in that the mass fraction of the monomer(s) in the polymer slurry, based on the total amount of hydrocarbon rubber present in the polymer slurry, is less than the mass fraction of the monomer(s) in the hydrocarbon rubber cement, based on the total amount of hydrocarbon rubber present in the rubber cement. Accordingly, a rubber cement consistent with the instant disclosure may be characterized as having a mass fraction of unreacted monomer(s) and other impurities relative to the hydrocarbon rubber in the rubber cement that is less than the mass fraction of unreacted monomer(s) and other impurities in the polymer slurry relative to the hydrocarbon rubber in the polymer slurry from which the rubber cement was produced.

The amount of diluent that is to be removed from the system in order to prepare an essentially homogeneous rubber cement is determined from the composition of the hydrocarbon-rubber slurry (i.e. mass fractions of the hydrocarbon-rubber and the diluent), the desired hydrocarbon-rubber cement concentration (i.e. mass fraction of hydrocarbon-rubber polymer in the hydrocarbon solvent) and the compositional phase diagram which describes the temperature-dependent phase behavior of the hydrocarbon-rubber as a function of diluent mass fraction in the cement. Removal of the diluent in amounts not sufficiently more than is necessary to produce the essentially homogeneous hydrocarbon-rubber cement refers to removing diluent in amounts necessary to obtain a cement composition that is no more than 10% removed from the composition that defines the boundary curve at a given temperature in the phase diagram.

Examples of compositional phase diagrams of butyl rubber in hexane-based cements with hydrofluorocarbons are given in FIG. 1 along with the phase diagram of the comparative methyl chloride system.

In some embodiments, the mass fraction of the unreacted monomer(s) in the hydrocarbon rubber cement, based on the total amount of hydrocarbon rubber present in the cement, is 10%, preferably 20%, more preferably 40%, less than the mass fraction of unreacted monomer(s) in the polymer slurry, based on the total amount of hydrocarbon rubber present in the polymer slurry.

In another embodiment, the mass fraction of unreacted monomer(s) in hydrocarbon rubber cement, based on the total amount of hydrocarbon rubber present in the cement, is less than 90%, preferably less than 80%, more preferably less than 60%, even more preferably less than 40%, and most preferably less than 20%, of the mass fraction of unreacted monomer(s) in the polymer slurry, based on the total amount of hydrocarbon rubber present in the polymer slurry.

In a preferred embodiment, the hydrocarbon rubber cement is essentially free from unreacted monomer(s), defined herein as an unreacted monomer(s) mass fraction of less than or equal to about 0.01 mass fraction.

In an embodiment, the recovered hydrofluorocarbon diluent, solvent, monomer(s), and the like, either as isolated from the polymer slurry or after subsequent purification, can be reused or recycled back to an appropriate step of the process or in an appropriate step in producing the hydrocarbon rubber polymer slurry. Accordingly, at least a portion of the hydrofluorocarbon diluent removed from the polymer slurry may be recycled back to produce at least a portion of another polymer slurry. At least a portion of the hydrocarbon solvent removed from the polymer slurry may be recycled back to produce another polymer slurry. At least a portion of the monomer(s) removed from the polymer slurry may be recycled back to produce additional hydrocarbon-rubber.

INDUSTRIAL APPLICATIONS

The process described herein may be used in the manufacture of polymers useful in a wide variety of applications. The reduced presence of monomer(s) in the rubber hydrocarbon-rubber cement allows for the formation of improved rubber compositions from the rubber hydrocarbon-rubber cements produced according to the instant processes. The low degree of permeability to gases that rubber has accounts for the largest uses of these polymers, namely inner tubes and tire innerliners. These same properties are also of importance in air cushions, pneumatic springs, air bellows, accumulator bags, and pharmaceutical closures. The thermal stability of the polymers of the present disclosure make them ideal for rubber tire-curing bladders, high temperature service hoses, and conveyor belts for hot material handling. The polymers also exhibit high damping and have uniquely broad damping and shock absorption ranges in both temperature and frequency. They are useful in molded rubber parts and find wide applications in automobile suspension bumpers, auto exhaust hangers, and body mounts.

The rubber cements produced by the instant process may be used to produce polymers useful in tire sidewalls and tread compounds. In sidewalls, the polymer characteristics impart good ozone resistance, crack cut growth, and appearance. The polymers of the instant processes may also be blended. Properly formulated blends with high diene rubbers that exhibit phase co-continuity yield excellent sidewalls. Improvements in wet, snow, and ice skid resistances and in dry traction without compromises in abrasion resistance and rolling resistance for high performance tires can be accomplished by using the polymers produced according to the instant disclosure.

Blends of the rubber polymers with thermoplastic resins may also be used for toughening of these compounds. High-density polyethylene and isotactic polypropylene are often modified with 5 to 30 wt % of polyisobutylene. In certain applications, the instant polymers provide for a highly elastic compound that is processable in thermoplastic molding equipment. The polymers produce by the instant process may also be blended with polyamides to produce other industrial applications.

The polymers produce by the instant process may also be used as adhesives, caulks, sealants, and glazing compounds. They may also be useful as plasticizers in rubber formulations with butyl, SBR, and natural rubber. In linear low density polyethylene (LLDPE) blends, they induce cling to stretch-wrap films. They may also be employed in lubricants as dispersants and in potting and electrical cable filling materials. In certain applications, the polymers produce by the instant process may be useful in chewing-gum, as well as in medical applications such as pharmaceutical stoppers, and in the arts for paint rollers.

In some embodiments, this disclosure relates to:
1. A process to produce an essentially homogeneous single liquid phase hydrocarbon-rubber cement from a polymer slurry comprising a hydrocarbon-rubber, a diluent, and unreacted monomer(s), the process comprising:
   (a) contacting the polymer slurry with a hydrocarbon solvent; and
   (b) removing the diluent in amounts not sufficiently more than is necessary to produce the essentially homogeneous single liquid phase hydrocarbon-rubber cement wherein the mass fraction of monomer(s) in the hydrocarbon-rubber cement, based on the total amount of hydrocarbon-rubber present in the hydrocarbon-rubber cement, is less than the mass fraction of monomer(s) in the hydrocarbon-rubber slurry, based on the total amount of hydrocarbon-rubber present in the hydrocarbon-rubber slurry,
   wherein the diluent comprises a hydrofluorocarbon.
2. A process to produce an essentially homogeneous hydrocarbon-rubber cement from a polymer slurry comprising a hydrocarbon-rubber, a diluent which is essentially free of a hydrofluorocarbon diluent, and a first mass fraction of unreacted monomer(s) based on the total amount of hydrocarbon rubber present in the polymer slurry, comprising:
   (a) contacting the polymer slurry with a hydrofluorocarbon diluent and with a hydrocarbon solvent; and
   (b) removing at least a portion of the diluent and the hydrofluorocarbon diluent to produce the essentially homogeneous hydrocarbon-rubber cement having a second mass fraction of unreacted monomer(s) based on the total amount of hydrocarbon rubber present in the essentially homogeneous hydrocarbon rubber cement, wherein the first mass fraction is greater than the second mass fraction.

3. A process for retrofitting an existing slurry cationic polymerization plant, the retrofitting process comprising the steps of:
   (a) contacting a polymer slurry from the slurry cationic polymerization plant with a hydrocarbon solvent, the polymer slurry comprises a hydrocarbon-rubber, a diluent, and a first mass fraction of unreacted monomer(s) based on the total amount of hydrocarbon rubber present in the polymer slurry; and
   (b) removing at least a portion of the diluent to produce an essentially homogeneous hydrocarbon-rubber cement having a second mass fraction of unreacted monomer(s) based on the total amount of hydrocarbon rubber present in the essentially homogeneous hydrocarbon-rubber cement,
   wherein the diluent comprises a hydrofluorocarbon, and
   wherein the first mass fraction is greater than the second mass fraction.

4. A process for retrofitting an existing slurry cationic polymerization plant, the retrofitting process comprising the steps of:
   (a) contacting a polymer slurry from the slurry cationic polymerization plant with a hydrofluorocarbon diluent and with a hydrocarbon solvent, the polymer slurry comprises a hydrocarbon-rubber, a diluent which is essentially free of a hydrofluorocarbon diluent, and a first mass fraction of unreacted monomer(s) based on the total amount of hydrocarbon rubber present in the polymer slurry;
   (b) removing at least a portion of the diluent and the hydrofluorocarbon diluent to produce the essentially homogeneous hydrocarbon-rubber cement having a second mass fraction of unreacted monomer(s) based on the total amount of hydrocarbon rubber present in the essentially homogeneous hydrocarbon rubber cement,
   wherein the first mass fraction is greater than the second mass fraction.

5. A process to produce a single liquid phase hydrocarbon-rubber cement from a polymer slurry comprising a hydrocarbon-rubber, a diluent, and a first mass fraction of unreacted monomer(s) in the polymer slurry based on the total weight of the hydrocarbon-rubber in the polymer slurry, the process comprising:
   (a) contacting the polymer slurry with a hydrocarbon solvent; and
   (b) removing at least a portion of the diluent from the polymer slurry to produce the single liquid phase hydrocarbon-rubber cement having a second mass fraction of unreacted monomer(s) in the hydrocarbon-rubber cement, based on the total amount of hydrocarbon-rubber present in the hydrocarbon-rubber cement,
   wherein the diluent comprises a hydrofluorocarbon and the first mass fraction is higher than the second mass fraction.

6. The process of any preceding paragraph, wherein the hydrofluorocarbon comprises at least one carbon atom, and at least two fluorine atoms.

7. The process of any preceding paragraph, wherein the hydrofluorocarbon comprises 1,1-difluoroethane.

8. The process of any preceding paragraph, wherein the hydrofluorocarbon comprises 1,1,1,2-tetrafluoroethane.

9. The process of any preceding paragraph, wherein the hydrofluorocarbon consists essentially of hydrogen, carbon, and fluorine.

10. The process of any preceding paragraph, wherein the mass fraction of the unreacted monomer(s) in the hydrocarbon-cement, based on the total weight of the hydrocarbon rubber in the hydrocarbon-cement, is less than the mass fraction of the unreacted monomer(s) in the polymer slurry, based on the total weight of the hydrocarbon rubber in the polymer slurry.

11. The process of any preceding paragraph, wherein the diluent further comprises methyl chloride.

12. The process of any preceding paragraph, wherein the hydrocarbon-rubber comprises polymer(s) and/or copolymer(s) of isobutylene, isoprene, para-methyl styrene, or a combination thereof.

13. The process of any preceding paragraph, wherein the diluent consists essentially of a hydrofluorocarbon.

14. The process of any preceding paragraph, wherein the polymer slurry is produced in a slurry cationic polymerization process for the production of $C_4$-$C_7$ isoolefin polymers.

15. The process of any preceding paragraph, wherein the polymer slurry comprises greater than or equal to about 10 vol % solids.

16. The process of any preceding paragraph, wherein the polymer slurry is at a temperature of less than or equal to about −20° C. when contacted with the hydrocarbon solvent.

17. The process of any preceding paragraph, wherein the mass fraction of the unreacted monomer(s) in the hydrocarbon-cement, based on the total weight of the hydrocarbon rubber in the hydrocarbon-cement, is less than 80% of the mass fraction of the unreacted monomer(s) in the polymer slurry, based on the total weight of the hydrocarbon rubber in the polymer slurry.

18. The process of any preceding paragraph, wherein the hydrocarbon-rubber cement is essentially free of unreacted monomer(s).

19. The process of any preceding paragraph, wherein the hydrofluorocarbon diluent is a gas at 25° C. and a pressure of 101.3 kPa-a.

20. The process of any preceding paragraph, wherein the hydrofluorocarbon is represented by the formula:

$$C_xH_yF_z$$

wherein x is an integer from 1 to 10, y is greater than or equal to 1; and z is greater than or equal to 1.

21. The process of any preceding paragraph, wherein the hydrofluorocarbon is selected from the group consisting of:
   fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane;

1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane-1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1,1,1-trifluoro-2-methylpropane; 1,1,3-trifluoro-2-methylpropane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; 1,1,2-trifluoroethene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof.

22. The process of any preceding paragraph, wherein the hydrocarbon solvent comprises $C_4$-$C_{10}$ hydrocarbons.

23. The process of any preceding paragraph, wherein the hydrocarbon solvent comprises linear, branched, or cyclic $C_5$-$C_8$ hydrocarbons.

24. The process of any preceding paragraph, wherein the hydrocarbon solvent comprises a $C_5$ to $C_7$ alkane.

25. The process of any preceding paragraph, wherein the hydrocarbon solvent is selected from the group consisting of:
   butane, cyclobutane, isobutane, n-pentane, cyclopentane, n-hexane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2-methylheptane, 3-ethylhexane, 2,5-dimethylhexane, 2,24,-trimethylpentane, octane, heptane, nonane, decane, dodecane, undecane, 1,1-dimethylcyclopentane, 1,2-dimethylcyclopentane, 1,3-dimethylcyclopentane, ethylcyclopentane, cyclohexane, methylcyclohexane, benzene, toluene, ortho-xylene, para-xylene, meta-xylene, and combinations thereof.

26. The process of any preceding paragraph, wherein the hydrocarbon solvent is a mixture of n-hexane, 2-methylpentane, 3-methylpentane, methylcyclopentane, and/or cyclohexane.

27. The process of any preceding paragraph, further comprising the steps of:
   (c) removing at least a portion of the hydrofluorocarbon from the polymer slurry; and
   (d) recycling at least a portion of the removed hydrofluorocarbon to produce additional polymer slurry.

28. The process of any preceding paragraph, further comprising the steps of:

(c) removing at least a portion of the hydrocarbon solvent; and
(d) recycling at least a portion of the removed hydrocarbon solvent to produce additional polymer slurry.
29. The process of any preceding paragraph, further comprising the steps of:
(c) removing at least a portion of the monomer(s); and
(d) recycling at least a portion of the removed monomer(s) to produce additional hydrocarbon-rubber.
30. The process of any preceding paragraph, further comprising:
adjusting the temperature and/or the pressure of the polymer slurry or the mixture of the polymer slurry and the hydrocarbon solvent.
31. The process of any preceding paragraph, further comprising:
adjusting the temperature, the pressure, the weight fraction of the hydrocarbon solvent in the resulting mixture, and/or the weight fraction of the diluent in the resulting mixture so that the resulting mixture is maintained as substantially homogeneous liquid phase.
32. A hydrocarbon-rubber cement composition made by a process of any preceding paragraph.

All patents and patent applications, test procedures (such as ASTM methods), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated.

While illustrative embodiments have been described with particularity, it will be understood that various other modifications will be apparent to and can be readily made by those skilled in the art without departing from the spirit and scope of the present disclosure. Accordingly, it is not intended that the scope of the claims appended hereto be limited to the examples and descriptions set forth herein, but rather that the claims be construed as encompassing all the features of patentable novelty which reside in the present disclosure, including all features which would be treated as equivalents thereof by those skilled in the art to which the present disclosure pertains.

What is claimed is:

1. A process to produce an essentially homogeneous single liquid phase hydrocarbon-rubber cement from a polymer slurry comprising a hydrocarbon-rubber, a diluent, and unreacted monomer(s), said process comprising:
(a) following polymerization of the hydrocarbon-rubber, contacting said polymer slurry with a hydrocarbon solvent; and
(b) removing said diluent and said hydrocarbon solvent in amounts not sufficiently more than is necessary to produce said essentially homogeneous single liquid phase hydrocarbon-rubber cement wherein the mass fraction of monomer(s) in the hydrocarbon-rubber cement, based on the total amount of hydrocarbon-rubber present in the hydrocarbon-rubber cement, is less than the mass fraction of monomer(s) in the hydrocarbon-rubber slurry, based on the total amount of hydrocarbon-rubber present in the hydrocarbon-rubber slurry,
wherein said diluent comprises a hydrofluorocarbon.

2. The process of claim 1, wherein said hydrofluorocarbon comprises at least one carbon atom, and at least two fluorine atoms.

3. The process of claim 1, wherein said hydrofluorocarbon comprises 1,1-difluoroethane.

4. The process of claim 1, wherein said hydrofluorocarbon comprises 1,1,1,2-tetrafluoroethane.

5. The process of claim 1, wherein said hydrofluorocarbon consists essentially of hydrogen, carbon, and fluorine.

6. The process of claim 1, wherein the mass fraction of said unreacted monomer(s) in said hydrocarbon-cement, based on the total weight of said hydrocarbon rubber in said hydrocarbon-cement, is less than the mass fraction of said unreacted monomer(s) in said polymer slurry, based on the total weight of said hydrocarbon rubber in said polymer slurry.

7. The process of claim 1, wherein said diluent further comprises methyl chloride.

8. The process of claim 1, wherein said hydrocarbon-rubber comprises polymer(s) and/or copolymer(s) of isobutylene, isoprene, para-methyl styrene, or a combination thereof.

9. The process of claim 1, wherein said diluent consists essentially of a hydrofluorocarbon.

10. The process of claim 1, wherein said polymer slurry is produced in a slurry cationic polymerization process for the production of $C_4$-$C_7$ isoolefin polymers.

11. The process of claim 1, wherein said polymer slurry comprises greater than or equal to about 10 vol % solids.

12. The process of claim 1, wherein said polymer slurry is at a temperature of less than or equal to about −20° C. when contacted with said hydrocarbon solvent.

13. The process of claim 1, wherein the mass fraction of said unreacted monomer(s) in said hydrocarbon-cement, based on the total weight of said hydrocarbon rubber in said hydrocarbon-cement, is less than 80% of the mass fraction of said unreacted monomer(s) in said polymer slurry, based on the total weight of said hydrocarbon rubber in said polymer slurry.

14. The process of claim 1, wherein said hydrocarbon-rubber cement is essentially free of unreacted monomer(s).

15. The process of claim 1, wherein said hydrofluorocarbon diluent is a gas at 25° C. and a pressure of 101.3 kPa-a.

16. The process of claim 1, wherein said hydrofluorocarbon is represented by the formula:

$$C_xH_yF_z$$

wherein x is an integer from 1 to 10, y is greater than or equal to 1; and z is greater than or equal to 1.

17. The process of claim 1, wherein said hydrofluorocarbon is selected from the group consisting of:
fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4- tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1,1,1-trifluoro-2-methylpropane; 1,1,3-trifluoro-2-methylpropane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; 1,1,2-trifluoroethene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof.

18. The process of claim 1, wherein said hydrocarbon solvent comprises $C_4$-$C_{10}$ hydrocarbons.

19. The process of claim 1, wherein said hydrocarbon solvent comprises linear, branched, or cyclic $C_5$-$C_8$ hydrocarbons.

20. The process of claim 1, wherein said hydrocarbon solvent comprises a $C_5$ to $C_7$ alkane.

21. The process of claim 1, wherein said hydrocarbon solvent is selected from the group consisting of:
butane, cyclobutane, isobutane, n-pentane, cyclopentane, n-hexane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2-methylheptane, 3-ethylhexane, 2,5-dimethylhexane, 2,24,-trimethylpentane, octane, heptane, nonane, decane, dodecane, undecane, 1,1-dimethylcyclopentane, 1,2-dimethylcyclopentane, 1,3-dimethylcyclopentane, ethylcyclopentane, cyclohexane, methylcyclohexane, benzene, toluene, ortho-xylene, para-xylene, meta-xylene, and combinations thereof.

22. The process of claim 1, wherein said hydrocarbon solvent is a mixture of n-hexane, 2-methylpentane, 3-methylpentane, methylcyclopentane, and/or cyclohexane.

23. The process of claim 1, further comprising the steps of:
(c) removing at least a portion of said hydrofluorocarbon from said polymer slurry; and
(d) recycling at least a portion of the removed hydrofluorocarbon to produce additional polymer slurry.

24. The process of claim 1, further comprising the steps of:
(c) removing at least a portion of said hydrocarbon solvent; and
(d) recycling at least a portion of the removed hydrocarbon solvent to produce additional polymer slurry.

25. The process of claim 1, further comprising the steps of:
(c) removing at least a portion of said monomer(s); and
(d) recycling at least a portion of the removed monomer(s) to produce additional hydrocarbon-rubber.

26. The process of claim 1, further comprising:
adjusting the temperature and/or the pressure of said polymer slurry or the mixture of said polymer slurry and said hydrocarbon solvent.

27. The process of claim 1, further comprising:
adjusting the temperature, the pressure, the weight fraction of the hydrocarbon solvent in said resulting mixture, and/or the weight fraction of the diluent in said resulting mixture so that said resulting mixture is maintained as substantially homogeneous liquid phase.

28. A process to produce an essentially homogeneous hydrocarbon-rubber cement from a polymer slurry comprising a hydrocarbon-rubber, a diluent which is essentially free of a hydrofluorocarbon diluent, and a first mass fraction of unreacted monomer(s) based on the total amount of hydrocarbon rubber present in said polymer slurry, comprising:
(a) following polymerization of said hydrocarbon-rubber, contacting said polymer slurry with a hydrofluorocarbon diluent and with a hydrocarbon solvent; and
(b) removing at least a portion of said diluent, said hydrofluorocarbon diluent, and said hydrocarbon solvent to produce said essentially homogeneous hydrocarbon-rubber cement having a second mass fraction of unreacted monomer(s) based on the total amount of hydrocarbon rubber present in said essentially homogeneous hydrocarbon rubber cement,
wherein said first mass fraction is greater than said second mass fraction.

29. The process of claim 28, wherein at least a portion of said hydrofluorocarbon diluent is added to said polymer slurry prior to the addition of said hydrocarbon solvent to said polymer slurry.

30. The process of claim 28, wherein at least a portion of said hydrofluorocarbon diluent is added to said polymer slurry after the addition of said hydrocarbon solvent to said polymer slurry.

31. The process of claim 28, wherein at least a portion of said hydrofluorocarbon diluent is added to said polymer slurry simultaneous with the addition of said hydrocarbon solvent to said polymer slurry.

32. The process of claim 28, wherein said hydrofluorocarbon diluent comprises at least two carbon atoms, and at least two fluorine atoms.

33. The process of claim 28, wherein said hydrofluorocarbon diluent comprises 1,1-difluoroethane.

34. The process of claim 28, wherein said hydrofluorocarbon diluent comprises 1,1,1,2-tetrafluoroethane.

35. The process of claim 28, wherein said hydrofluorocarbon diluent consists essentially of hydrogen, carbon, and fluorine.

36. The process of claim 28, wherein said first mass fraction is less than 80% of said second mass fraction.

37. The process of claim 28, wherein said diluent comprises methyl chloride.

38. The process of claim 28, wherein said hydrocarbon-rubber comprises polymer(s) and/or copolymer(s) of isobutylene, isoprene, para-methyl styrene, or a combination thereof.

39. The process of claim 28, wherein said polymer slurry is produced in a slurry cationic polymerization process for the production of $C_4$-$C_7$ isoolefin polymers.

40. The process of claim 28, wherein said polymer slurry comprises greater than or equal to about 10 vol % solids.

41. The process of claim 28, wherein said polymer slurry is at a temperature of less than or equal to about −20° C. when contacted with said hydrocarbon solvent.

42. The process of claim 28, wherein said first mass fraction is at least ten times greater than said second mass fraction.

43. The process of claim 28, wherein said hydrocarbon-rubber cement is essentially free of unreacted monomer(s).

44. The process of claim 28, wherein said hydrofluorocarbon diluent is a gas at 25° C. and 101 kPa-a (1 atm) of pressure.

45. The process of claim 28, wherein said hydrofluorocarbon diluent is represented by the formula:

$C_xH_yF_z$ wherein x is an integer from 1 to 10, y is greater than or equal to 1; and z is greater than or equal to 1.

46. The process of claim 28, wherein said hydrofluorocarbon diluent is selected from the group consisting of:
fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1, 2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2, 2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1, 1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1, 2,2,3,3,4-octafluorobutane; 1,1,1,2,2,3,4,4-octafluorobutane; 1,1,1,2,3,3,4,4-octafluorobutane; 1,1,1,2,2,4, 4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1,1,1-trifluoro-2-methylpropane; 1,1,3-trifluoro-2-methylpropane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)

propane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; 1,1,2-trifluoroethene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,2,3,4,4-heptafluoro-2-butene; 1,1,1,2,4,4,4-heptafluoro-2-butene; and mixtures thereof.

47. The process of claim 28, wherein said hydrocarbon solvent comprises $C_4$-$C_{10}$ hydrocarbons.

48. The process of claim 28, wherein said hydrocarbon solvent comprises linear, branched, or cyclic $C_5$-$C_8$ hydrocarbons.

49. The process of claim 28, wherein said hydrocarbon solvent comprises a $C_5$ to $C_7$ alkane.

50. The process of claim 28, wherein said hydrocarbon solvent is selected from the group consisting of: butane, cyclobutane, isobutane, n-pentane, cyclopentane, n-hexane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2-methylheptane, 3-ethylhexane, 2,5-dimethylhexane, 2,24,-trimethylpentane, octane, heptane, nonane, decane, dodecane, undecane, 1,1-dimethylcyclopentane, 1,2-dimethylcyclopentane, 1,3-dimethylcyclopentane, ethylcyclopentane, cyclohexane, methylcyclohexane, benzene, toluene, ortho-xylene, para-xylene, meta-xylene, and combinations thereof.

51. The process of claim 28, wherein said hydrocarbon solvent is a mixture of n-hexane, 2-methylpentane, 3-methylpentane, methylcyclopentane, and cyclohexane.

52. The process of claim 28, wherein at least a portion of said diluent removed from said polymer slurry is recycled to produce at least a portion of another polymer slurry.

53. The process of claim 28, wherein at least of portion of said hydrocarbon solvent removed from said polymer slurry is recycled and contacted with another polymer slurry.

54. The process of claim 28, wherein at least a portion of said monomer(s) removed from said polymer slurry is recycled to produce additional hydrocarbon-rubber.

55. The process of claim 28, further comprising:
(c) adjusting the temperature and/or the pressure of said polymer slurry or the mixture of said polymer slurry, said hydrofluorocarbon diluent, said hydrocarbon solvent, and/or a combination thereof.

56. The process of claim 28, further comprising:
(c) adjusting the temperature, the pressure, the weight fraction of the hydrocarbon solvent in said resulting mixture, and/or the weight fraction of the hydrofluorocarbon diluent in said resulting mixture so that said resulting mixture is maintained as substantially homogeneous liquid phase.

57. A hydrocarbon-rubber cement composition made by a process of claim 1.

58. A hydrocarbon-rubber cement composition made by a process of claim 28.

59. A process to produce a single liquid phase hydrocarbon-rubber cement from a polymer slurry comprising a hydrocarbon-rubber, a diluent, and a first mass fraction of unreacted monomer(s) in said polymer slurry based on the total weight of said hydrocarbon-rubber in said polymer slurry, said process comprising:
(a) following polymerization of said hydrocarbon-rubber, contacting said polymer slurry with a hydrocarbon solvent; and
(b) removing at least a portion of said diluent and said hydrocarbon solvent from said polymer slurry to produce said single liquid phase hydrocarbon-rubber cement having a second mass fraction of unreacted monomer(s) in said hydrocarbon-rubber cement, based on the total amount of hydrocarbon-rubber present in said hydrocarbon-rubber cement,
wherein said diluent comprises a hydrofluorocarbon and said first mass fraction is higher than the second mass fraction.

60. The process of claim 59, wherein said hydrofluorocarbon comprises 1,1-difluoroethane.

61. The process of claim 59, wherein said hydrofluorocarbon comprises 1,1,1,2-tetrafluoroethane.

62. The process of claim 59, wherein said diluent further comprises methyl chloride.

63. The process of claim 59, wherein said hydrocarbon-rubber comprises polymer(s) and/or copolymer(s) of isobutylene, isoprene, para-methyl styrene, or a combination thereof.

64. The process of claim 59, wherein said polymer slurry is produced in a slurry cationic polymerization process for the production of $C_4$-$C_7$ isoolefin polymers.

65. The process of claim 59, wherein said polymer slurry is at a temperature of less than or equal to about $-20°$ C. when contacted with said hydrocarbon solvent.

66. The process of claim 59, wherein the mass fraction of said unreacted monomer(s) in said hydrocarbon-cement, based on the total weight of said hydrocarbon rubber in said hydrocarbon-cement, is less than 80% of the mass fraction of said unreacted monomer(s) in said polymer slurry, based on the total weight of said hydrocarbon rubber in said polymer slurry.

67. The process of claim 59, wherein said hydrofluorocarbon is represented by the formula:

$$C_xH_yF_z$$

wherein x is an integer from 1 to 10, y is greater than or equal to 1; and z is greater than or equal to 1.

68. The process of claim 59, wherein said hydrocarbon solvent comprises $C_4$-$C_{10}$ hydrocarbons.

69. The process of claim 59, wherein said hydrocarbon solvent is a mixture of n-hexane, 2-methylpentane, 3-methylpentane, methylcyclopentane, and/or cyclohexane.

70. The process of claim 59, further comprising the steps of:
(c) removing at least a portion of said hydrofluorocarbon from said polymer slurry; and
(d) recycling at least a portion of the removed hydrofluorocarbon to produce additional polymer slurry.

71. The process of claim 59, further comprising the steps of:
(c) removing at least a portion of said hydrocarbon solvent; and
(d) recycling at least a portion of the removed hydrocarbon solvent to produce additional polymer slurry.

72. The process of claim 59, further comprising the steps of:
(c) removing at least a portion of said monomer(s); and
(d) recycling at least a portion of the removed monomer(s) to produce additional hydrocarbon-rubber.

73. The process of claim 59, further comprising:
adjusting the temperature and/or the pressure of said polymer slurry or the mixture of said polymer slurry and said hydrocarbon solvent.

74. The process of claim 59, further comprising:
adjusting the temperature, the pressure, the weight fraction of the hydrocarbon solvent in said resulting mixture, and/or the weight fraction of the diluent in said resulting mixture so that said resulting mixture is maintained as substantially homogeneous liquid phase.

75. A hydrocarbon-rubber cement composition made by a process of claim 59.

* * * * *